United States Patent Office 3,509,148
Patented Apr. 28, 1970

3,509,148
4-ARYL-1,2-DIHYDRO-2-QUINAZOLINEPROPIONI-TRILE 3-OXIDE AND RELATED COMPOUNDS
Stanley C. Bell, Penn Valley, Pa., assignor to American Home Products Corporation, New York, N.Y., a corporation of Delaware
No Drawing. Filed Feb. 12, 1968, Ser. No. 704,584
Int. Cl. C07d 51/48
U.S. Cl. 260—251          10 Claims

ABSTRACT OF THE DISCLOSURE

This invention is concerned with 4-aryl-1,2-dihydro-2-quinazolinepropionitrile 3-oxides and 4-aryl-2-quinazolinepropionitriles which are pharmacologically active as central nervous system depressants. Further, it is concerned with a process of reacting a 4-aryl-1,2-dihydro-2-quinazoline propionitrile 3-oxide with a carboxylic acid anhydride, in the presence of acid acceptor, organic solvent, to produce the corresponding 4-aryl-2-quinazolinepropionitrile.

The present invention is concerned with quinazolinepropionitriles. In particular, it relates to 4-aryl-1,2-dihydro-2-quinazolinepropionitrile 3-oxides and 4-aryl-2-quinazolinepropionitriles which have demonstrated central nervous system depressant activity in standard and accepted pharmacological tests.

The new and novel compounds within the purview of the present invention are represented by the following structural formulae:

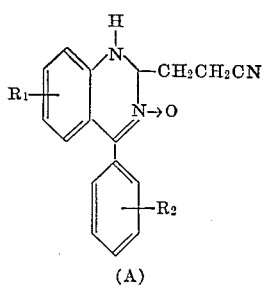

(A)

and

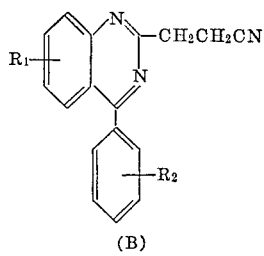

(B)

wherein $R_1$ and $R_2$ are both selected from the group consisting of hydrogen, halogen, lower alkyl and lower alkoxy. The terms "lower alkyl" and "lower alkoxy" as employed herein are meant to include both branched and straight chain moieties having from one to about eight carbon atoms. The compounds of the present invention which are represented by Formula A are called: "4-aryl-1,2-dihydro-2-quinazolinepropionitrile 3-oxides." Typical examples thereof are: 6-chloro-1,2-dihydro-4-phenyl-2-quinazolinepropionitrile 3-oxide and 1,2-dihydro-6-methyl-4-phenyl-2-quinazolinepropionitrile 3-oxide. Alternatively, those compounds of this invention which are depicted by Formula B are named: "4-aryl-2-quinazolinepropionitriles," such as, 6-chloro-4-phenyl-2-quinazolinepropionitrile and 6-methyl-4-phenyl-2-quinazolinepropionitrile.

The new and novel 4-aryl-1,2-dihydro-2-quinazolinepropionitrile 3-oxides of the present invention may be prepared by the process which is hereinafter schematically depicted:

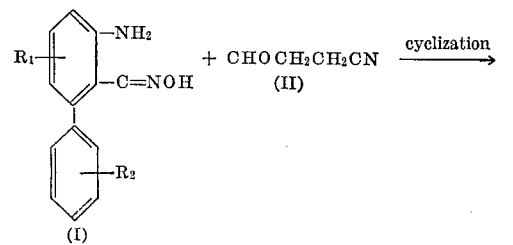

(I)

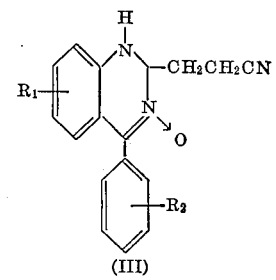

(III)

wherein $R_1$ and $R_2$ are defined as above. The reaction is effected by contacting an appropriate 2-aminobenzophenone oxime (I) with 3-cyanopropionaldehyde (II) in a reaction-inert solvent, in the presence of an acid catalyst, for a period of about one to about ten hours at a temperature from about 25° C. to about 60° C. Preferably this reaction is conducted in approximately a 1:4 mixture of water and methanol, in the presence of a catalytic amount of acetic acid, at about room temperature for a period of about two hours.

When the cyclization reaction is complete, the resulting 4-aryl-1,2-dihydro - 2 - quinazolinepropionitrile 3-oxide (III) is separated by conventional procedures. For example, the reaction mixture is filtered and the collected precipitate recrystallized from an appropriate solvent, e.g. acetonitrile, benzene, chloroform, an alkanol and the like. By the term "reaction-inert solvent" as employed above is meant either an organic or inorganic solvent or mixtures thereof which will dissolve the reactants but not interfere with their interaction, e.g. water, an alkanol or mixtures thereof. The expression "acid catalyst" means a proton donor, such as, acetic acid and hydrochloric acid. Many other such acids will readily suggest themselves to those skilled in the art of chemistry. The starting materials, particularly the 2-aminobenzophenone oximes (I), employed in the above reaction are readily prepared by well known procedures. One such procedure is described by Sternback et al. in J.A.C.S., vol. 82, p. 475 (1960).

The 4-aryl-2-quinazolineproprionitriles of the present invention are prepared by the new and novel process which is illustrated by the following reaction scheme:

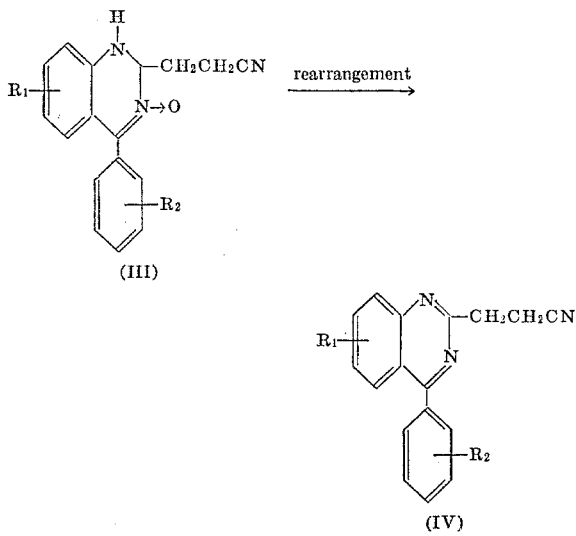

wherein $R_1$ and $R_2$ are defined as above. The reaction is effected by contacting an appropriate 4-aryl-1,2-dihydro-2-quinazolinepropionitrile 3-oxide (III) with a carboxylic acid anhydride, in an acid acceptor, organic solvent for a period of about five minutes to about thirty minutes at a temperature of about 70° C. to about 120° C. Preferably this reaction is conducted with acetic anhydride in pyridine at about steam bath temperatures for a period of about five minutes.

When the rearrangement reaction is complete, the resulting 4-aryl-2-quinazolinepropionitrile (IV) is recovered by standard techniques, e.g. the reaction mixture is filtered and the collected precipitate either washed or recrystallized from an appropriate solvent, e.g. an alkanol. By the term "acid acceptor, organic solvent" is meant a basic organic solvent which will not interfere with the interaction of the reactants but will also neutralize any resulting carboxylic acid by-product. Many such compounds will readily suggest themselves to one skilled in the chemical art, for example, pyridine, dimethylaniline, triethylamine, N-methylpiperidine and the like.

The 4-aryl-1,2-dihydro-2 - quinazolinepropionitrile 3-oxides (III) and 4-aryl-2-quinazolinepropionitriles (IV) of the present invention possess valuable pharmcological activity. In particular, these compounds in standard pharmacological procedures demonstate central nervous system depressant activity and are useful as anticonvulsant agents. The 4-aryl-1,2-dihydro-2-quinazolinepropionitrile 3-oxides (III) are also useful intermediates in the preparation of their corresponding 4-aryl-2-quinazolinepropionitriles (IV).

In the pharmacological evaluation of the central nervous system depressant compounds of this invention the in vivo effects of the compounds of this invention are tested as follows:

The compound is administered orally or intraperitoneally to three mice (14 to 24 grams) at each of the following doses: 400, 120, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anticonvulsant acivity.

The 4-aryl-1,2-dihydro-2-quianozolinepropionitrile 3-oxides (III) of the present invention when administered orally in the above procedure induce decreased respiration at 40 mg./kilo; and decreased motor activity, sedative-ataxic effects and protection against maximal electroshock at 127 mg./kilo. When administered intraperitoneally these compounds (III) induce decreased respiration, decreased motor activity and sedative-ataxic effects at 40 mg./kilo. There were no deaths in the test animals at the highest oral or intraperitoneal dose used (400 mg./kg.).

The 4-aryl-2-quinazolinepropionitriles (IV) of the present invention when administered intraperitoneally in the above procedure protect against maximal electroshock at 127 mg./kg. and induce decreased motor activity at 400 mg./kg. There were no deaths in the test animals at the hghest dose used, 400 mg./kg., intraperitoneally.

When the compounds of this invention are employed as central nervous system depressants in warm-blooded animals, e.g. mice, they may be administered alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solution or they may be injected parenterally. For parenteral administration they may be used in the form of a sterile solution containing other solutes, for example, enough saline or glucose to make the solution isotonic.

The dosage of the present pharmacological agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration.

EXAMPLE I

A mixture of 38.6 g. of 2-amino-5-chlorobenzophenone oxime, 26 g. of 3-cyanopropionaldehyde, 300 ml. of water, 1100 ml. of methanol and 6 ml. of acetic acid is stirred for two hours at room temperature. The yellow precipitate (38 g.) is collected and recrystallized from acetonitrile to afford 6-chloro-1,2-dihydro-4-phenyl-2-quinazolinepropionitrile 3-oxide, M.P. 175–178° C.

Analysis.—Calc'd for $C_{17}H_{14}ClN_3O$ (percent): C, 65.49; H, 4.52; Cl, 11.37; N, 13.48. Found (percent): C, 65.15; H, 4.44; Cl, 11.20; N, 13.66.

In a similar manner, 2-amino-4-bromobenzophenone oxime is reacted with 3-cyanopropionaldehyde to yield 7-bromo-1,2-dihydro-4-phenyl - 2 - quinazolinepropionitrile 3-oxide.

EXAMPLE II

A mixture of 19 g. of 2-amino-5-methylbenzophenone oxime, 13 g. of 3-cyanopropionaldehyde, 150 ml. of water, 550 ml. of ethanol and 3 ml. of acetic acid is stirred for one hour at 60° C. The resulting precipitate is collected and recrystallized from benzene to afford 1,2-dihydro - 6 - methyl-4-phenyl-2-quinazolinepropionitrile 3-oxide.

In like manner, 2-amino-6-ethyl-4'-methoxybenzophenone oxime is reacted with 3-cyanopropionaldehyde to yield 5-ethyl-1,2-dihydro-4 - (p-methoxyphenyl)-2-quinazolinepropionitrile 3-oxide.

EXAMPLE III

A mixture of 75 g. of 2-aminobenzophenone oxime, 55 g. of 3-cyanopropionaldehyde, 3 liters of ethanol and 15 ml. of hydrochloric acid is stirred for ten hours at room temperature. The resulting precipitate is collected and recrystallized from chloroform to afford 1,2-dihydro-4-phenyl-2-quinazolinepropionitrile 3-oxide.

EXAMPLE IV

A mixture of 13 g. of 4'-chloro-5-methoxybenzophenone oxime, 9.0 g. of 3-cyanopropionaldehyde, 100 ml. of water, 375 ml. of methanol and 2 ml. of acetic acid is stirred for three hours at 50° C. The resulting precipitate is collected and recrystallized from methanol to afford 4 - (p-chlorophenyl) - 6-methoxy-1,2-dihydro-2-quinazolinepropionitrile 3-oxide.

Similarly, 7-fluoro-1,2-dihydro-4-(m-isopropylphenyl)-2-quinazolinepropionitrile 3-oxide is synthesized.

EXAMPLE V

A mixture of 35 g. of 5-chloro-4'-methylbenzophenone oxime, 25 g. of 3-cyanopropionaldehyde, 300 ml. of water, 1100 ml. of methanol and 6 ml. of hydrochloric acid is stirred for two hours at room temperature. The resulting precipitate is collected and recrystallized from acetonitrile to afford 6-chloro-1,2-dihydro-4-(p-tolyl)-2-quinazolinepropionitrile 3-oxide.

EXAMPLE VI

Repeating the procedure of Examples I–V to react an appropriate 2-aminobenzophenone oxime with 3-cyanopropionaldehyde, the following 4-aryl-1,2-dihydro-2-quinazolinepropionitrile 3-oxides are obtained:

1,2-dihydro-8-methyl-4-(p-propoxyphenyl)-2-quinazolinepropionitrile 3-oxide;
4-(o-bromophenyl)-1,2-dihydro-6-iodo-2-quinazolinepropionitrile 3-oxide;
7-ethoxy-1,2-dihydro-4-phenyl-2-quinazolinepropionitile 3-oxide;
4-(m-fluorophenyl)-1,2-dihydro-2-quinazolinepropionitrile 3-oxide;
1,2-dihydro-4-phenyl-6-propyl-2-quinazolinepropionitrile 3-oxide;
6-butoxy-4-(p-butoxyphenyl)-1,2-dihydro-2-quinazolinepropionitrile 3-oxide;
4-(m-ethoxyphenyl)-1,2-dihydro-2-quinazolinepropionitrile 3-oxide; and
4-(p-ethylphenyl)-1,2-dihydro-2-quinazolinepropionitrile 3-oxide.

EXAMPLE VII

To a mixture of 2.0 g. of 6-chloro-1,2-dihydro-4-phenyl-2-quinazolinepropionitrile 3-oxide, as prepared in Example I, and 10 ml. of pyridine, there is added 3 ml. of acetic anhydride. Thereafter, the reaction mixture is heated to 100° C. for five minutes and then diluted with water (approx. 30 ml.). The resulting precipitate is collected and washed with ethanol to afford 6-chloro-4-phenyl-2-quinazolinepropionitrile, 135–136° C.

Analysis.—Calc'd for $C_{17}H_{12}ClN_3$ (percent): C, 69.51; H, 4.12; N, 14.31; Cl, 12.07, (percent). Found (percent): C, 70.13; H, 3.68; N, 14.58; Cl, 12.07.

Similarly, 7-bromo-1,2-dihydro-4-phenyl-2-quinazolinepropionitrile 3-oxide is converted to 7-bromo-4-phenyl-2-quinazolinepropionitrile.

EXAMPLE VIII

To a mixture of 4.0 g. of 1,2-dihydro-6-methyl-4-phenyl-2-quinazolinepropionitrile 3-oxide, as prepared in Example II, and 20 ml. of pyridine, there is added 6 ml. of butyric anhydride. Thereafter, the reaction mixture is heated to 70° C. for thirty minutes and then diluted with water (60 ml.). The resulting precipitate is collected and recrystallized from isopropanol to afford 6-methyl-4-phenyl-2-quinazolinepropionitrile.

In like manner, 5-ethyl-1,2-dihydro-4-(p-methoxyphenyl)-2-quinazolinepropionitrile 3-oxide in dimethylaniline is contacted with acetic anhydride to yield 5-ethyl-4-(p-methoxyphenyl)-2-quinazolinepropionitrile.

EXAMPLE IX

To a mixture of 1.0 g. of 1,2-dihydro-4-phenyl-2-quinazolinepropionitrile 3-oxide, as prepared in Example III, and 5 ml. of triethylamine, there is added 1.5 ml. of propionic anhydride. Thereafter, the reaction mixture is heated to reflux for five minutes and then diluted with water (15 ml.). The resulting precipitate is collected and washed with methanol to afford 4-phenyl-2-quinazolinepropionitrile.

EXAMPLE X

To a mixture of 8.0 g. of 4-(p-chlorophenyl)-6-methoxy - 1,2-dihydro-2-quinazolinepropionitrile 3-oxide, as prepared in Example IV, and 40 ml. of N-methylpiperidine, there is added 12 ml. of acetic anhydride. Thereafter, the reaction mixture is heated to steam bath temperature for ten minutes and then diluted with water (120 ml.). The resulting precipitate is collected and washed with methanol to yield 4-(p-chlorophenyl)-6-methoxy-2-quinazolinepropionitrile.

Similarly, 7-fluoro-1,2-dihydro-4-(m-isopropylphenyl)-2-quinazolinepropionitrile 3-oxide is converted to 7-fluoro - 4-(m-isopropylphenyl)-2-quinazolinepropionitrile.

EXAMPLE XI

To a mixture of 2.0 g. of 6-chloro-1,2-dihydro-4-(p-tolyl)-2-quinazolinepropionitrile 3-oxide, as prepared in Example V, and 10 ml. of pyridine, there is added 3 ml. of acetice anhydride. Thereafter, the reaction mixture is heated to 100° C. for ten minutes and then diluted with water (30 ml.). The resulting precipitate is collected and washed with ethanol to yield 6-chloro-4-(p-tolyl)-2-quinazolinepropionitrile.

EXAMPLE XII

Repeating the procedure of Examples VI–XI to react an appropriate 4-aryl-1,2-dihydro-2-quinazolinepropionitrile 3-oxide, as prepared in Example V, with a carboxylic acid anhydride, the following compounds are obtained:

8-methyl-4-(p-propoxyphenyl)-2-quinazolinepropionitrile;
4-(o-bromophenyl)-6-iodo-2-quinazolinepropionitrile;
7-ethoxy-4-phenyl-2-quinazolinepropionitrile;
4-(m-fluorophenyl)-2-quinazolinepropionitrile;
4-phenyl-6-propyl-2-quinazolinepropionitrile;
6-butoxy-4-(p-butoxyphenyl)-2-quinazolinepropionitrile;
4-(m-ethoxyphenyl)-2-quinazolinepropionitrile; and
4-(p-ethylphenyl)-2-quinazolinepropionitrile.

What is claimed is:
1. A compound selected from the group consisting of those having the formulae:

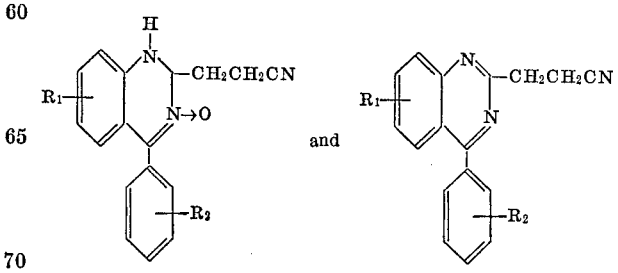

wherein $R_1$ and $R_2$ are both selected from the group consisting of hydrogen, halogen, lower alkyl and lower alkoxy.

2. A compound as described in claim 1 which is:

6 - chloro-1,2-dihydro-4-phenyl-2-quinazolinepropionitrile 3-oxide.

3. A compound as described in claim 1 which is: 6-chloro-4-phenyl-2-quinazolinepropionitrile.

4. A compound as described in claim 1 which is: 1,2 - dihydro-6-methyl-4-phenyl-2-quinazolinepropionitrile 3-oxide.

5. A compound as described in claim 1 which is: 6-methyl-4-phenyl-2-quinazolinepropionitrile.

6. A compound as described in claim 1 which is: 1,2-dihydro-4-phenyl-2-quinazolinepropionitrile 3-oxide.

7. A compound as described in claim 1 which is: 4-phenyl-2-quinazolinepropionitrile.

8. A compound as described in claim 1 which is: 4-(p-chlorophenyl)-6-methoxy - 1,2 - dihydro-2-quinazolinepropionitrile 3-oxide.

9. A process for the preparation of compounds having the formula:

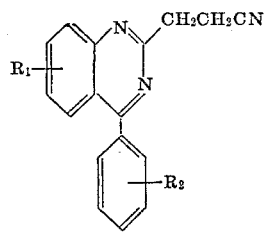

wherein $R_1$ and $R_2$ are both selected from the group consisting of hydrogen, halogen, lower alkyl and lower alkoxy, which comprises contacting a compound of the formula:

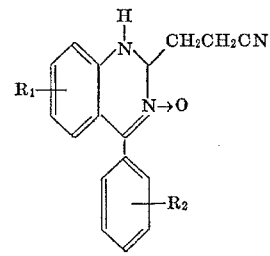

wherein $R_1$ and $R_2$ are defined as above, with a carboxylic acid anhydride selected from the group consisting of acetic anhydride, propionic anhydride and butyric anhydride in a basic organic solvent, at a temperature range from about 70° C. to about 120° C. for a period of about five to about thirty minutes.

10. A process as described in claim 9 wherein the basic organic solvent is selected from the group consisting of pyridine, dimethylaniline, triethylamine and N-methylpiperidine.

References Cited

Ried et al.: C.A. 58, 7938a (1963).

ALEX MAZEL, Primary Examiner

R. V. RUSH, Assistant Examiner

U.S. Cl. X.R.

424—251